United States Patent
Lahr et al.

(10) Patent No.: US 9,891,705 B1
(45) Date of Patent: Feb. 13, 2018

(54) AUTOMATIC BORESIGHTING OF HEAD-WORN DISPLAY

(71) Applicant: Rockwell Collins, Inc., Cedar Rapids, IA (US)

(72) Inventors: Weston J. Lahr, Sherwood, OR (US); William T. Kirchner, Leesburg, VA (US); David I. Han, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/247,284

(22) Filed: Aug. 25, 2016

(51) Int. Cl.
*G06F 3/01* (2006.01)
*G06K 9/20* (2006.01)
*F41G 3/22* (2006.01)

(52) U.S. Cl.
CPC ............ *G06F 3/012* (2013.01); *F41G 3/225* (2013.01); *G06K 9/2054* (2013.01)

(58) Field of Classification Search
CPC ..... G06F 3/012; G06F 3/0346; G06K 9/2054; F41G 3/225; H04M 11/064
See application file for complete search history.

(56) References Cited

U.S. PATENT DOCUMENTS

| | | | |
|---|---|---|---|
| 5,645,077 A | 7/1997 | Foxlin | |
| 5,812,257 A | 9/1998 | Teitel et al. | |
| 6,162,191 A | 12/2000 | Foxlin | |
| 6,176,837 B1 | 1/2001 | Foxlin | |
| 6,311,129 B1 | 10/2001 | Lin | |
| 6,361,507 B1 | 3/2002 | Foxlin | |
| 6,377,401 B1 | 4/2002 | Bartlett | |
| 6,408,245 B1 | 6/2002 | An et al. | |
| 6,409,687 B1 | 6/2002 | Foxlin | |
| 6,449,559 B2 | 9/2002 | Lin | |
| 6,474,159 B1 | 11/2002 | Foxlin et al. | |
| 6,480,152 B2 | 11/2002 | Lin et al. | |
| 6,658,354 B2 | 12/2003 | Lin | |
| 6,681,629 B2 | 1/2004 | Foxlin et al. | |
| 6,738,714 B2 | 5/2004 | McCall et al. | |
| 6,786,877 B2 | 9/2004 | Foxlin | |

(Continued)

OTHER PUBLICATIONS

Pending unpublished U.S. Appl. No. 13/971,695 to Roggendort, filed Aug. 20, 2013.

*Primary Examiner* — Abbas Abdulselam
(74) *Attorney, Agent, or Firm* — Angel N. Gerdzhikov; Donna P. Suchy; Daniel M. Barbieri

(57) ABSTRACT

A system and method for automatic boresighting of a head-tracking system for a HWD or HUD accesses georeferenced pose (position/orientation) data of an aircraft or other mobile platform from a georeferenced head-tracker and platform-referenced head pose data (based on fiducial markers within the aircraft cockpit) from the inertial measurement units of an optical, magnetic, or optical/magnetic platform-referenced head tracker (PRHT) and determines misalignments of the PRHT relative to the boresighted inertial reference system (IRS) of the aircraft. Based on the determined misalignments and accessed data, the IMUs of the PRHT may be updated and aligned with the aircraft boresight. Misalignments of head-mounted fiducial markers with the boresighted IRS may be determined for updating the alignment of an optical head-tracker fixed relative to the aircraft cockpit.

20 Claims, 5 Drawing Sheets

(56) References Cited

U.S. PATENT DOCUMENTS

| | | |
|---|---|---|
| 6,820,025 B2 | 11/2004 | Bachmann et al. |
| 7,000,469 B2 | 2/2006 | Foxlin et al. |
| 7,046,215 B1 | 5/2006 | Bartlett |
| 7,266,446 B1 | 9/2007 | Pelosi |
| 7,301,648 B2 | 11/2007 | Foxlin |
| 7,395,181 B2 | 7/2008 | Foxlin |
| 7,409,290 B2 | 8/2008 | Lin |
| 7,640,106 B1 | 12/2009 | Stokar et al. |
| 7,672,781 B2 | 3/2010 | Churchill et al. |
| 8,019,538 B2 | 9/2011 | Soehren et al. |
| 8,165,844 B2 | 4/2012 | Luinge et al. |
| 8,953,154 B2 | 2/2015 | Galea et al. |
| 8,965,736 B2 | 2/2015 | Horton et al. |
| 9,541,763 B1 * | 1/2017 | Heberlein ........... G02B 27/0179 |
| 2015/0317838 A1 * | 11/2015 | Foxlin .................... G02B 27/06 345/633 |

* cited by examiner

AUTOMATIC BORESIGHTING OF HEAD-WORN DISPLAY

BACKGROUND

Embodiments of the inventive concepts disclosed herein are directed generally to head-tracking systems and methods for automatically aligning components of a head-tracking system to a vehicular boresight or reference frame (a process generally referred to as "boresighting"). While generally associated with aircraft, boresighting may also apply to ground-based or seagoing vehicles. A head-tracking system may be utilized in a head-worn display (HWD) to provide enhanced situational awareness to the wearer (e.g., a pilot or crewmember). The head-tracking system may include a georeferenced inertial head-tracker (GHT) to determine the position and orientation of the wearer's head relative to the earth, and thereby accurately display imagery of the wearer's surroundings. The HWD may further generate and superimpose symbology on the displayed images to further augment scene content.

In order to meaningfully enhance situational awareness, the head-tracking system must be accurate and responsive (e.g., low-latency, high-rate refresh). Otherwise, displayed objects and features may not conform precisely to the real-world visible positions of those objects and features; for example, an object projected onto the combiner of an HWD may not align precisely with the actual, visible object. For example, the GHT may incorporate platform-referenced head tracking to determine the position and orientation of the wearer's head relative to the platform and thereby estimate the position and orientation of the head relative to the earth. For example, the inertial measurement units (IMU) of the GHT may be used for high frequency (e.g., >100 Hz) detection of head poses (pose including both a position and a relative orientation, e.g., of the head relative to the platform) as the head moves from instant to instant. An optical magnetic, or other absolute position/orientation sensing tracker (e.g., an optical head-tracker (OHT) or magnetic head-tracker (MHT)) may correct the GHT at a lower frequency by estimating head positions relative to the aircraft, using a series of optical markers (e.g., reflectors or light-emitting diodes (LEDs)) detectable by a helmet-mounted camera aligned with the user's head, or by a cockpit-mounted camera (wherein the optical markers are helmet-mounted). This requires that the optical markers be characterized and located in reference to the aircraft boresight, an expensive and time-consuming process.

SUMMARY

In one aspect, embodiments of the inventive concepts disclosed herein are directed to a head-tracking system. The system may include a group of optical markers positioned in a fixed, fiducial pattern within an aircraft or other mobile platform. The system may include a georeferenced head tracker (GHT) associated with the head of a user (e.g., a pilot of the aircraft) for providing georeferenced head pose data. The system may include a platform referenced head tracker (PRHT) associated with the head of the user, the PRHT including inertial management units (IMU) for providing platform-referenced head pose data based on the group of optical markers. The system may include a controller coupled to the GHT and/or PRHT and couplable to an inertial reference system (IRS) of the aircraft (for determining georeferenced aircraft pose data). The IRS may be boresighted, e.g., aligned with the aircraft boresight. The controller may engage a calibration mode of the head-tracking system and access the georeferenced aircraft pose data and the platform-referenced head pose data, and determining misalignments of the PRHT relative to the IRS or the aircraft, based on the georeferenced aircraft pose data and the platform-referenced head pose data. The processor may determine alignment data for aligning the head-tracking system relative to the boresight, and update the IMUs of the PRHT based on the alignment data.

In a further aspect, embodiments of the inventive concepts disclosed herein are directed to a head-worn display (HWD). The HWD may include a display unit attachable to the head of the user (e.g., via a helmet or goggles), for providing georeferenced images and symbology to the user. The HWD may include a head-tracking system including a GHT configured to be associated with the head, for providing georeferenced head pose data. The head-tracking system may include a PRHT configured to be associated with the head and including IMUs for providing platform-referenced head pose data based on a group of optical markers positioned in a fixed fiducial pattern within an aircraft or other mobile platform. The head-tracking system may include a controller coupled to the GHT and PRHT, and couplable to an aircraft IRS (for providing georeferenced aircraft pose data). The IRS may be boresighted, e.g., aligned with the aircraft boresight. The controller may include a processor for accessing the georeferenced aircraft pose data and the platform-referenced head pose data, and determining misalignments of the PRHT relative to the IRS or the aircraft, based on the georeferenced aircraft pose data and the platform-referenced head pose data. The processor may determine alignment data for aligning the head-tracking system relative to the boresight, and update the IMUs of the PRHT based on the alignment data.

In a still further aspect, embodiments of the inventive concepts disclosed herein are directed to a method for automatic boresighting of a head-tracking system. The method may include generating georeferenced pose data of an aircraft or other mobile platform via an IRS aligned with the aircraft boresight. The method may include generating platform-referenced head pose data associated with a head of a user via IMUs of a PRHT of the head-tracking system, based on fiducial markers positioned within the aircraft (or mounted on the helmet or head). The method may include determining, via a controller of the head-tracking system, misalignment of the PRHT relative to the IRS or the aircraft based on the georeferenced aircraft pose data and the platform-referenced head pose data. The method may include determining, via the controller, alignment data for aligning the head-tracking system to the aircraft boresight based on the determined correlations. The method may include updating the IMUs of the PRHT based on the determined alignment data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
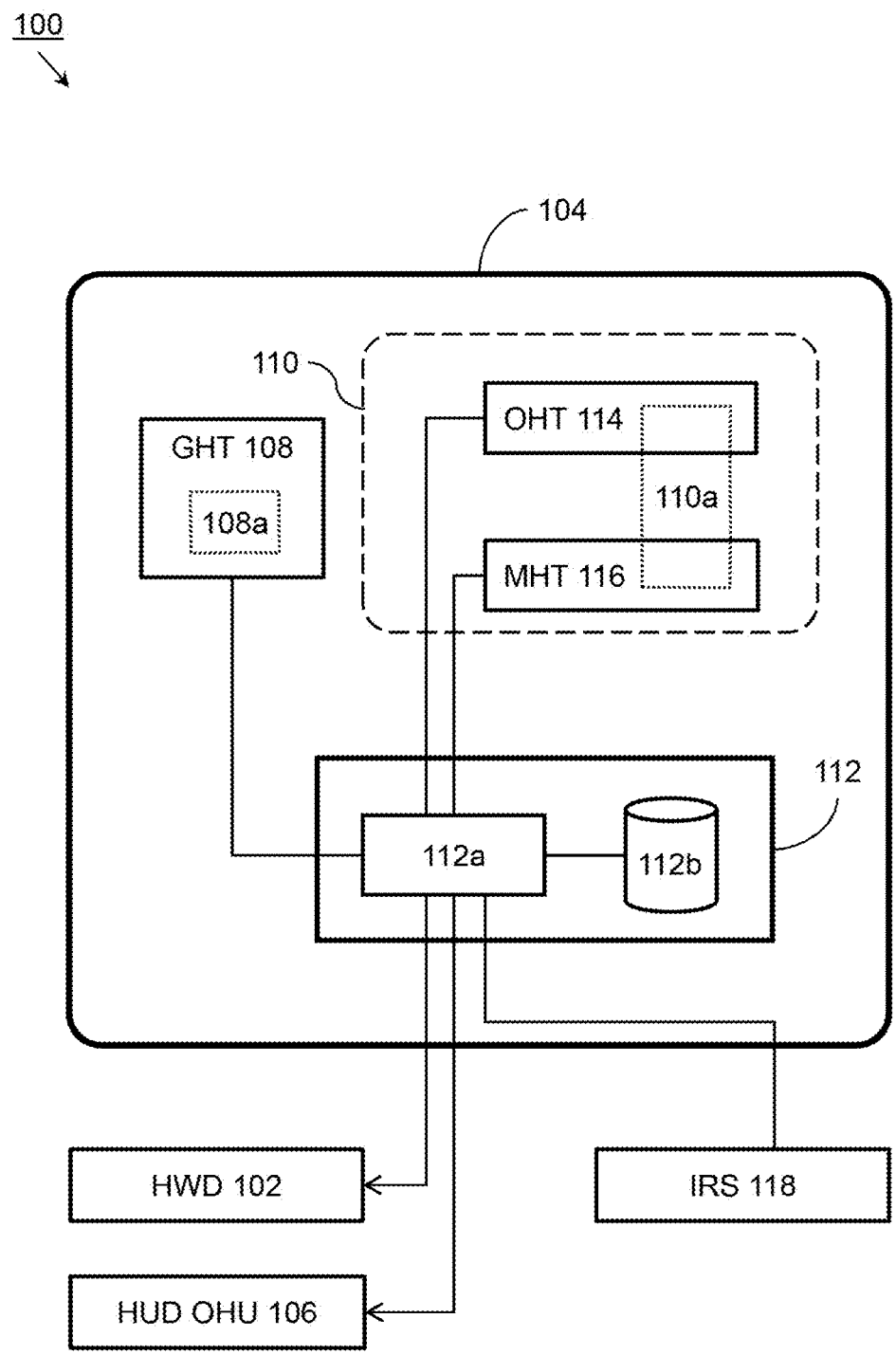
FIG. 1 illustrates an exemplary embodiment of a system for automatic boresighting of a head-tracking system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and related methods for automatic boresighting of a head-tracking system of a HWD and/or HUD. The costly and cumbersome process of boresighting a head-worn IMU (e.g., of an optical head-tracking system including a head-mounted camera or fiducial pattern of markers) may be replaced with a simpler process for calibrating the IMU to the aircraft boresight by estimating the misalignment or position of the camera or the fiducial markers relative to either the IMU or to the aircraft. The alignment of the IMU to the aircraft boresight may be monitored after initialization, and recalibrated if alignment errors exceed acceptable levels.

Referring to FIG. 1, an exemplary embodiment of a head-tracker 100 according to the inventive concepts disclosed herein may include a head-worn display (HWD) 102 and head-tracking system 104. The head-tracking system 104 may operate independently of the HWD 102, configured to provide georeferenced head pose data to other onboard or offboard aircraft and avionics systems. The head-tracking system 104 may be helmet-based (e.g., co-located with the HWD 102) or implemented as a stand-alone head-worn device (e.g., a headband, headphones, goggles, or glasses) or via an overhead unit (OHU) 106 of a head-up display (HUD). The HWD 102 may, for example, be implemented as a helmet-based display; as a biocular, binocular, or monocular display; as a night vision device (NVD); or as a set of goggles. The image streams displayed by the HWD 102 may be fully, partially, or selectively immersive. The HWD 102 may be coupled to any appropriate avionics systems, including heads-up guidance systems, synthetic vision systems (SVS), enhanced vision systems (EVS), combined vision systems (CVS), 2D and 3D imaging systems, or other image generation and display systems to provide georeferenced imagery, symbology, alerts, and indications to a user.

The head-tracking system 104 may include a georeferenced head-tracker (GHT) 108, a platform-referenced head tracker (PRHT) 110, and a controller 112 coupled to the GHT 108, the PRHT 110, and the HWD 102. The GHT 108 may be implemented as an inertial head-tracker wherein one or more intrinsically georeferenced inertial measurement units (IMU) 108a determine a georeferenced pose (position/orientation) of a head of the user (e.g., by integrating sensed rotations or accelerations of the head). The controller 112 of the head-tracking system 104 may include one or more processors 112a and a non-transitory memory 112b. The PRHT 110 may include IMUs 110a and may be, for example, an optical head-tracker 114 (OHT), a magnetic head-tracker 116 (MHT), or a combined OHT/MHT. The GHT 108 may be initialized or updated via the PRHT 110 in concert with a georeferenced inertial reference system (IRS) 118 or other systems configured to measure the velocity, position, or acceleration of a mobile platform relative to the earth, thereby providing a georeferenced pose of the mobile platform to the controller 112.

Figure 2:
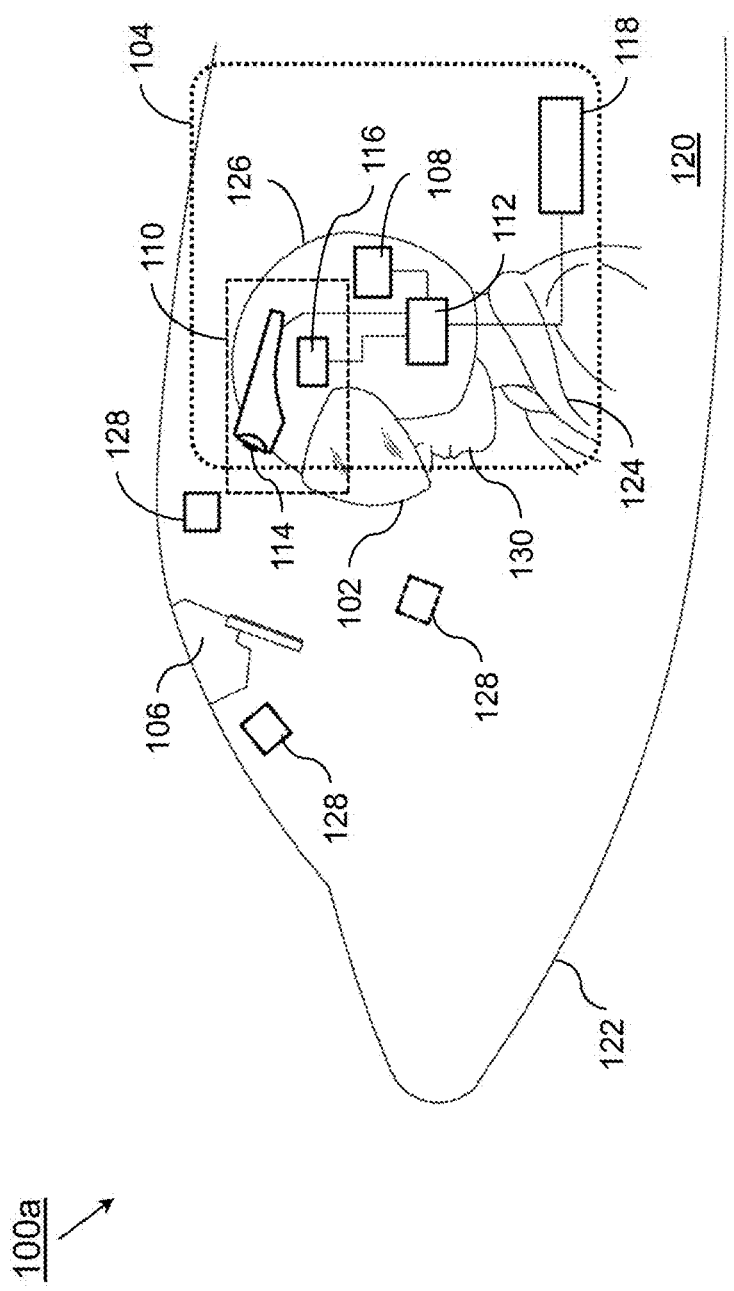
FIG. 2 is a cockpit view of the system of FIG. 1.

Referring now to FIG. 2, an exemplary embodiment of a head-tracker 100a according to the inventive concepts disclosed herein may be implemented and may operate identically to the head-tracker 100 of FIG. 1, except that the head-tracker 100a may be embodied in a cockpit 120 of a mobile platform, e.g., an aircraft 122. In addition to the aircraft 122, the mobile platform may include a ground-based combat or transportation vehicle, a submersible craft, or a ship or similar seagoing craft controlled by a user 124 wearing the head-tracking system 104 (e.g., via a helmet 126). The user 124 may be physically present in the cockpit 120, or the user 124 may control the mobile platform remotely. For example, the mobile platform may be a remotely piloted unmanned aerial vehicle (UAV). The GHT 108 of the head-tracking system 104 may be initialized or updated via the PRHT 110 in concert with avionics systems of the aircraft 122, e.g., a georeferenced inertial reference system (IRS) 124, an onboard GPS system, or other systems configured to provide a georeferenced pose of the aircraft 122. For example, the controller 112 may process, time, and combine the respective outputs of the PRHT 110 and the IRS 118 to provide correction data to the GHT 108 (e.g., to compensate for the natural drift error of the GHT). The PRHT 110 may include an MHT 116 having a 4π-steradian field of regard and coupled to a magnetic calibration map indicative of magnetic field data, which map may be stored or updated by the controller 112. If, for example, the GHT 108 is not co-located with the HWD 102 but rather fixed within the cockpit 120 (e.g., in an aft-oriented HUD OHU 106 rigidly mounted to the aircraft 122), control processing may be performed by a processor remotely located from the OHT 114 (e.g., OHU-mounted or located elsewhere within the cockpit 106) and wirelessly linked to the PRHT 110.

The OHT 114 may be implemented as a forward-facing optical head-tracker, e.g., an electro-optical (EO) camera or similar image sensor aligned with the HWD 102. For example, when the user 124 is facing forward, the OHT 114 may detect one or more optical markers 128 positioned in a fiducial pattern in the cockpit 120. Optical markers 128 may include reflectors or emitters (e.g., light-emitting diodes (LED)) applied to an interior surface of the cockpit 120, or any other type of active or passive marker capable of defining a fiducial pattern detectable by the OHT 114. In some embodiments, a cockpit feature having a fixed location such as a display surface, window, glare shield, windshield pillar, may be identified by the OHT 114 as a detectable optical marker 128. In some embodiments, the OHT 114 may be a camera mounted to the cockpit (e.g., in a fixed position relative to the aircraft 122) configured to identify or detect aft-facing or panoramic optical trackers 128. For example, the optical markers 128 may be positioned in a fiducial pattern on the helmet 126 for detection by an aft-facing OHT 114 (e.g., an OHT 114 mounted to the OHU 106 or otherwise fixed in the cockpit 120). The fiducial pattern may be detectable by the OHT 114 in any appropriate electromagnetic spectral band or combination of bands, e.g., visible, infrared (IR), near-infrared (NIR), or ultraviolet (UV).

Rather than characterizing or locating each optical tracker 128 relative to the boresight of the aircraft 122, the optical markers 128 may be positioned in a fiducial pattern around the cockpit 120 such that the position of each optical marker 128 can be characterized in relation to the other optical markers of the fiducial pattern. The pose of the head 130 of the user 126 may then be determined based on the identification or detection by the GHT 108 and OHT 114 (via the respective IMUs 108a and 110a, FIG. 1) of the fiducial pattern of optical markers 128 positioned within the cockpit 120, the fiducial pattern representing a fixed and known alignment between each optical marker 128. Therefore, the orientation of the optical markers 128 relative to the aircraft 122 (and therefore to the aircraft boresight) does not change. Accordingly, an accurate orientation of the OHT 114 (or the MHT 116, or a combination of the OHT and MHT if the PRHT 110 includes both) to the aircraft boresight may be determined by integrating misalignments (e.g., static alignment angles) of the OHT 114 relative to the IMUs 108a of the GHT 108 or to the boresighted IRS 118 of the aircraft 122. In the case of a fiducial pattern of optical markers 128 positioned on the helmet 126 and detected by a fixedly mounted aft-facing OHT 114 (e.g., mounted to HUD OHU 106), the orientation of the optical markers 128 to the aircraft boresight may be determined by integrating misalignments of the optical markers 128 to the IMUs 108a of the GHT 108 or to the boresighted IRS 118.

The controller 112 may initiate the boresighting/calibration process automatically or at the initiation of the user 124. When the calibration mode is engaged, the controller 112 may signal the HWD 102 or the HUD to indicate calibration mode by displaying an annunciation (e.g., "CAL") via the appropriate display surface and suspending normal display of all other symbology. When the calibration process is complete, e.g., when the alignment data generated by the controller 112 exceeds a predetermined confidence level, the controller may disengage calibration mode and resume normal display of symbology, terminating the calibration annunciation to indicate to the user 130 that the head-tracking system 104 has been calibrated to the desired degree of precision. Alternatively, or additionally, the controller 112 may present altered or degraded precision symbology to indicate an ongoing calibration process. For example, a degraded flight path vector may be displayed at an intensity or solidity keyed to the confidence level of the alignment data. The controller 112 may update the alignment of the IMUs 110a (FIG. 1) of the PRHT 110 (e.g., of the OHT 114, the MHT 116, or the combined OHT/MHT) of the head-tracking system 104 with alignment data of a sufficient confidence level. The processor 112a (FIG. 12) of the controller 112 may store an implemented alignment to the non-transitory memory 112b. The controller 112 may continue to monitor the alignment of the OHT 114 with the boresight of the aircraft 122 based on continually updated head pose data (from the GHT 108 and OHT 114 via IMUs 108a, 110a) and aircraft pose data (from the boresighted IRS 118). For example, the controller 112 may estimate a variance of the error between the output of the GHT 108 and the output of the OHT 114, or track the magnitude of the measured error. Should the estimated variance exceed a predetermined error threshold, or should the controller 112 log a number of error measurements of significant magnitude (e.g., via Kalman filter) the controller 112 may signal the user 126 (via the HWD 102 or OHU 106) to recalibrate the PRHT 110 or automatically restart the calibration process by re-engaging the calibration mode.

Figure 3:
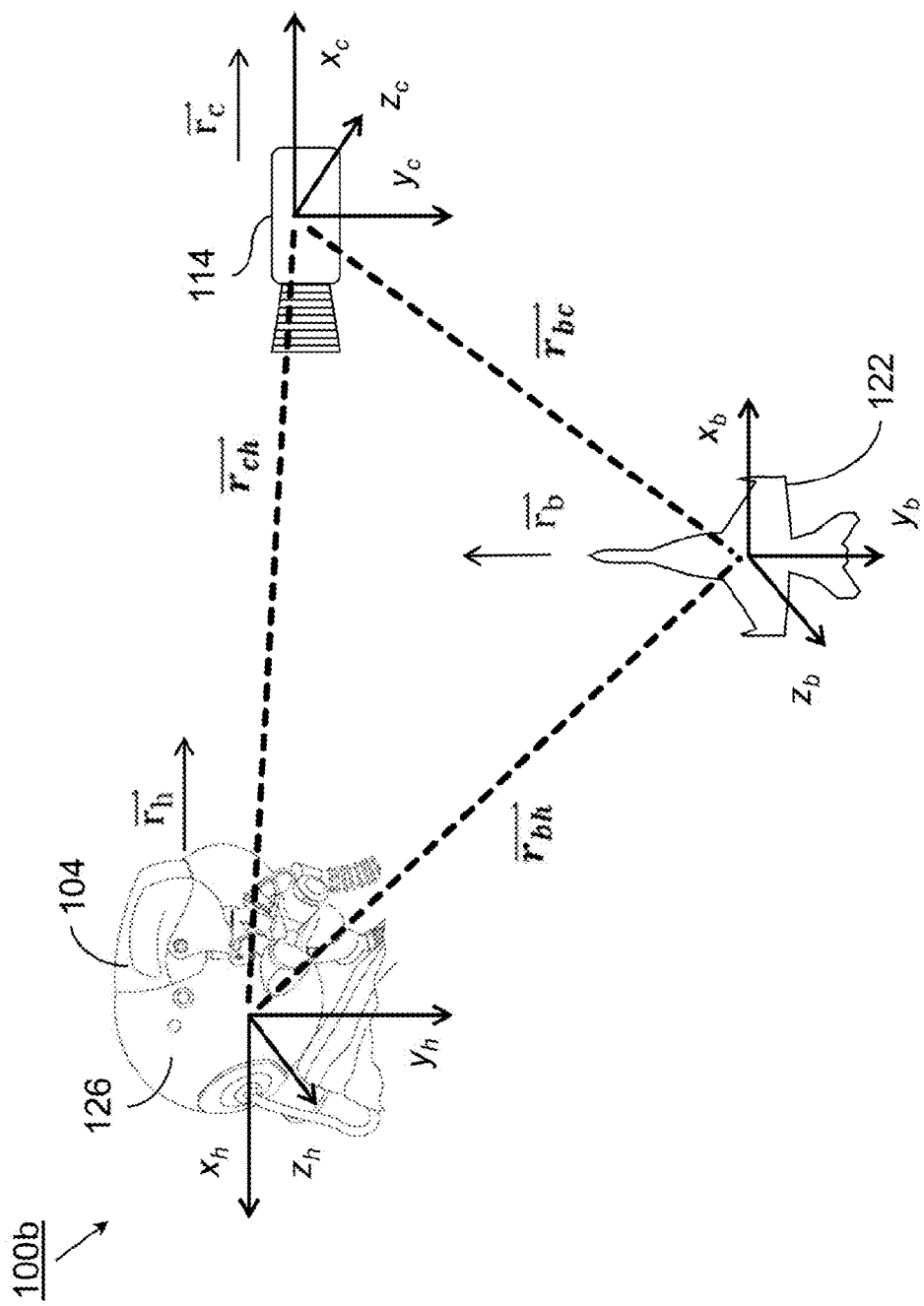
FIG. 3 illustrates coordinate reference frames in the system of FIG. 1.

Referring to FIG. 3, an exemplary embodiment of the head-tracker 100b according to the inventive concepts disclosed herein may be implemented and may function identically to the head-tracker 100a of FIG. 2, except that the head-tracking system 104, the OHT 114, and the aircraft 122 of the head-tracker 100b may each move according to individual frames of rotation. For example, the aircraft 122 (or any appropriate vehicle or body b) may move ($\vec{r}_b$) relative to its own rotational axes $x_b$, $y_b$, and $z_b$ (e.g., the respective pitch, roll, and yaw axes of the aircraft 122). Any object aboard the aircraft 122 may likewise move according to the motion $\vec{r}_b$ of the aircraft. Similarly, the OHT 114 may be a camera c that moves ($\vec{r}_c$) relative to the aircraft 122 according to its own rotational axes $x_c$, $y_c$, and $z_c$ and the head-tracking system 104 may be fixed to the head 130 (FIG. 2) or based in a helmet h (126) that moves ($\vec{r}_h$) relative to the aircraft 122 according to its rotational axes $x_b$, $y_b$, and $z_b$. If the OHT 114 is fixed to the aircraft 122 (e.g., in the case of an aft-facing OHT 114 and a fiducial pattern of optical markers (128, FIG. 2) fixed to the helmet 126), the motion $\vec{r}_{bc}$ of the OHT 114 (camera c) relative to the earth may be fixed relative to $\vec{r}_b$. Alternatively, if the OHT 114 is fixed to the head-tracking system 104 (via an OHT 114 mounted to the helmet 126 and optical markers 128 positioned within the aircraft 122), the motion $\vec{r}_{ch}$ of the OHT 114 may be fixed relative to $\vec{r}_h$.

Assuming the OHT 114 is helmet-mounted or otherwise fixed to the head-tracking system 104 (and therefore $\vec{r}_c = \vec{r}_h$), the user 126 (FIG. 2) may generate a measurement model θ representing the apparent magnitude of $\vec{r}_{bh}$ by rotation and motion of the head 126, recorded by the IMUs 108a (FIG. 1) of the GHT 108 and the IMUs 110a (FIG. 1) of the OHT 114, while the motion of the aircraft 122 ($\vec{r}_b$) is tracked by the boresighted IRS 118, such that $$\theta = C(q_c^h)\delta b - \Phi + \varphi$$

where $C(q_c^h)$ may represent a direction cosine matrix (DCM) descriptive of the relative rotation from the camera frame c to the head frame h and δb may represent misalignment errors (apparent vs. actual) with respect to the OHT 114 (or, in the alternative, δb may represent misalignment errors of the MHT 116 (FIG. 2)).

Figure 4A:
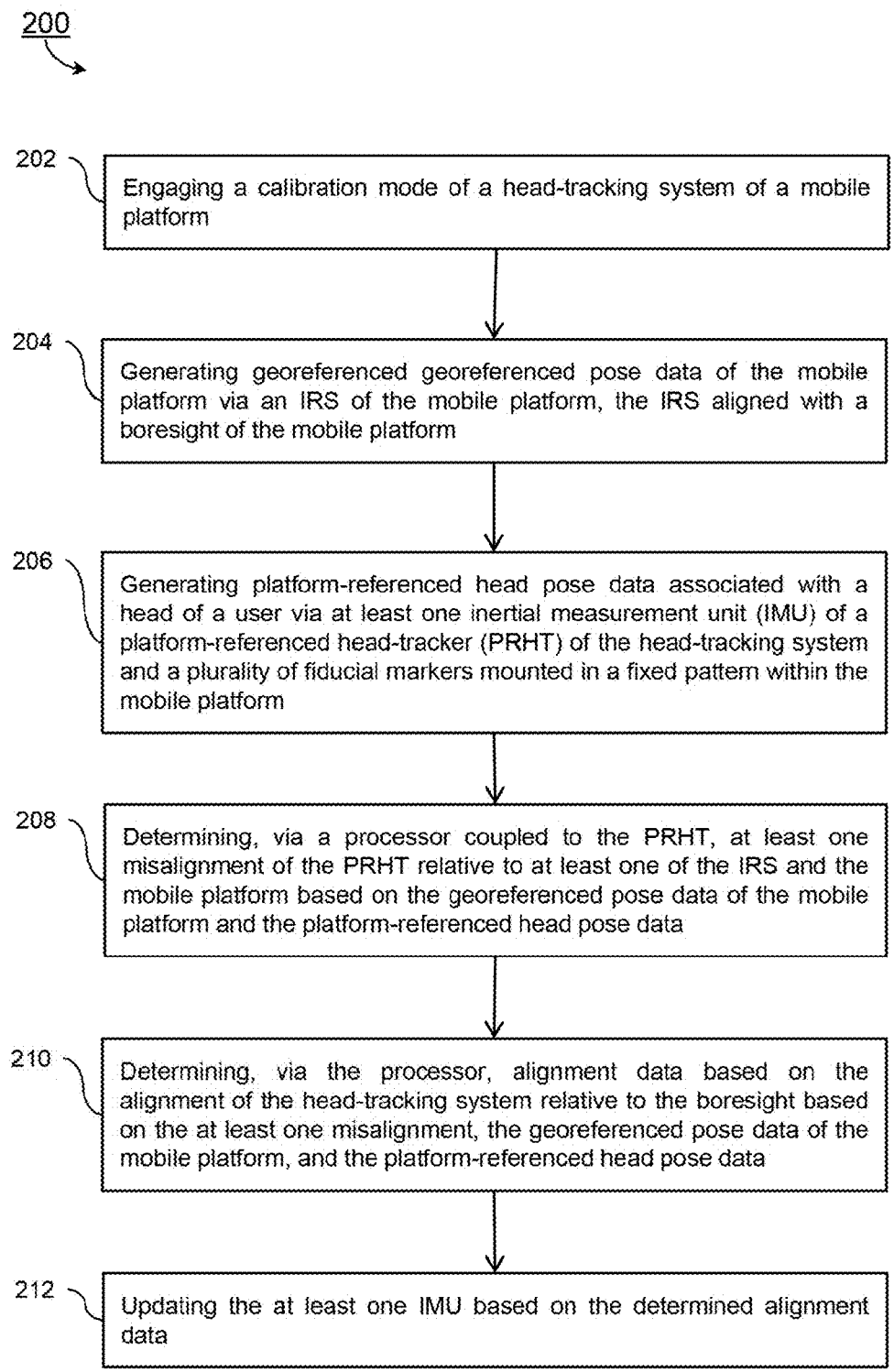
FIGS. 4A-C illustrate an exemplary embodiment of a method for automatic boresighting of a head-tracking system according to the inventive concepts disclosed herein.
Figure 4B:
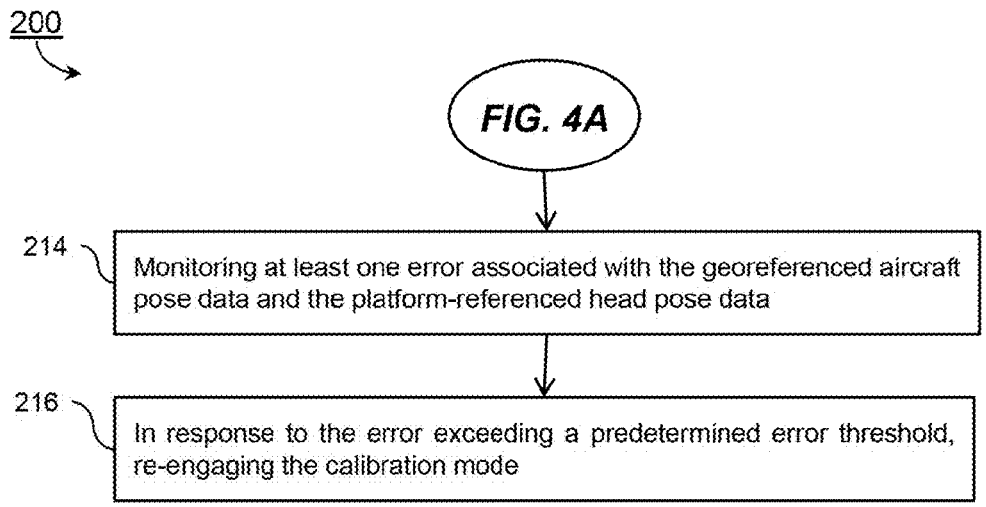
Figure 4C:
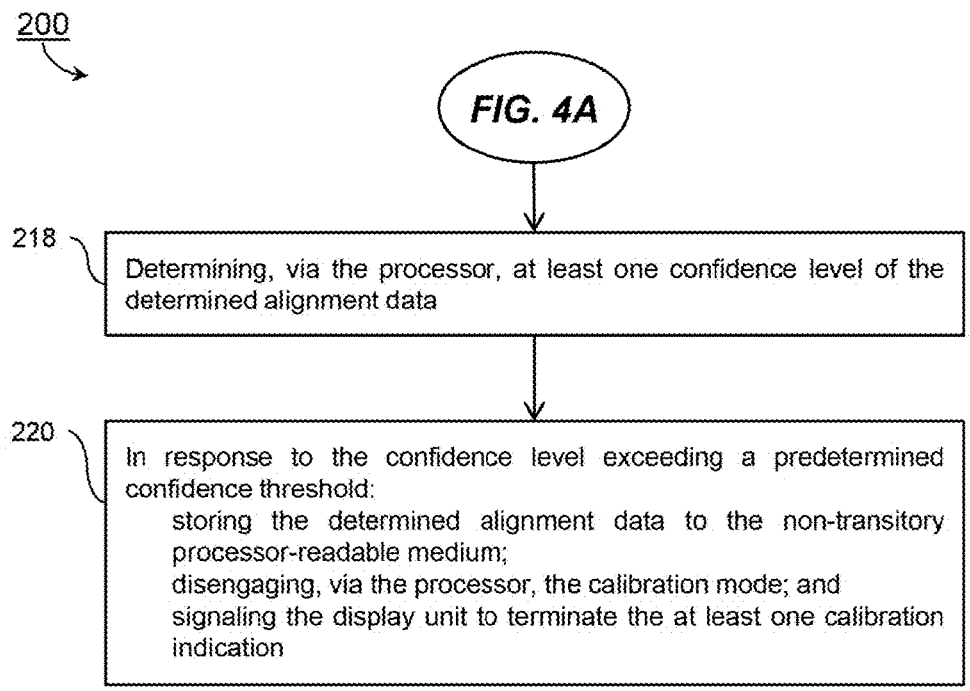

Referring now to FIGS. 4A-C, an exemplary embodiment of a method 200 for automatic boresighting of a head-tracking system according to the inventive concepts disclosed herein may be implemented by the head-tracker 100 in some embodiments, and may include one or more of the following steps.

Referring particularly to FIG. 4A, at a step 202, the head-tracking system engages a calibration mode. The controller of the head-tracking system may signal the HWD/HUD to indicate to the user that calibration mode is active. For example, the HWD/HUD may display a calibration annunciation, e.g., "CAL", and terminate all other symbology during calibration mode. The HWD/HUD may display degraded symbology corresponding to a confidence level of alignment data, e.g., that increases in intensity as the confidence level increases. The head-tracking system may be embodied in an aircraft or in a ground-based or water-based vehicle.

At a step 204, the head-tracking system accesses georeferenced aircraft pose data generated by a boresighted IRS of the aircraft.

At a step 206, the head-tracking system accesses platform-referenced head pose data associated with the user's head, the head pose data generated by IMUs of a PRHT of the head-tracking system and optical markers positioned within the aircraft. For example, the head pose data may be generated by an OHT, by an MHT, or by a combined OHT/MHT. The PRHT may be a component of a HWD (e.g., a forward-facing OHT) or a component of an HUD (e.g., an aft-facing OHT mounted in a HUD OHU). The PRHT may be fixed relative to the head (e.g., via a head-mounted OHT/MHT), and the optical markers fixed in a fiducial pattern within the aircraft cockpit. In some embodiments, the optical markers may be fixed in a fiducial pattern to the head (e.g., to the helmet of the user) and the PRHT may be fixed relative to the cockpit and the aircraft.

At a step 208, the controller determines misalignments of the PRHT relative to the IRS or the aircraft based on the georeferenced aircraft pose data and the platform-referenced head pose data. For example, the correlations may be determined by a processor remotely located from, and wirelessly linked to, the head-tracking system. In some embodiments, the controller determines misalignments of the fiducial markers to the IRS or the aircraft.

At a step 210, the controller determines alignment data for aligning the head-tracking system to the aircraft boresight, the alignment data based on the determined misalignments, the georeferenced pose data of the mobile platform, and the platform-referenced head pose data.

At a step 212, the controller updates the IMUs of the PRHT (the OHT, the MHT, or both) with the determined alignment data.

Referring particularly to FIG. 4B, the method 200 may include additional steps 214 and 216. At the step 214, the controller may monitor, subsequent to an IMU update, any subsequent errors between the georeferenced aircraft pose data and the platform-referenced head pose data. For example, the controller may monitor error variances, or the number of measured errors of sufficient magnitude.

At the step 216, if the monitored errors exceed a predetermined error threshold, the controller may re-engage the calibration mode.

Referring particularly to FIG. 4C, the method 200 may include additional steps 218 and 220. At the step 218, the controller may determine a confidence level of the determined alignment data.

At the step 220, if the confidence level exceeds a predetermined confidence threshold, the controller may update the IMUs, store the determined alignment data to memory, disengage the calibration mode, and signal the HWD/HUD to terminate the calibration annunciation or special symbology.

As will be appreciated from the above, systems and methods according to embodiments of the inventive concepts disclosed herein may provide a cost-effective and simplified means of automatically boresighting head-tracking systems of an aircraft-based HWD or HUD. Furthermore, the systems and methods according to embodiments of the inventive concepts disclosed herein may provide an efficient means of monitoring and updating the alignment of the HWD/HUD-based head-tracking system to the aircraft boresight.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A head-tracking system, comprising:
   one or more fiducial markers positioned in a fixed pattern within a mobile platform;

a georeferenced head tracker (GHT) configured to be associated with a head of a user, the GHT configured to provide georeferenced pose data of the mobile platform;

at least one platform-referenced head tracker (PRHT) configured to be associated with the head, the PRHT including at least one inertial management unit (IMU) configured to determine platform-referenced head pose data based on the one or more fiducial markers;

at least one controller coupled to the GHT and the at least one PRHT and configured to be coupled to at least one inertial reference system (IRS) of the mobile platform, the IRS configured to be aligned with a boresight of the mobile platform and to provide georeferenced pose data of the mobile platform, the controller including at least one processor coupled with a non-transitory processor-readable medium and configured to:

engage a calibration mode of the head-tracking system;

access the georeferenced pose data of the mobile platform and the platform-referenced head pose data;

determine at least one misalignment of the PRHT relative to at least one of the IRS and the mobile platform based on the georeferenced aircraft pose data and the platform-referenced head pose data;

determine, based on the at least one of the misalignment, the georeferenced pose data of the mobile platform, and the platform-referenced head pose data, alignment data based on the alignment of the head-tracking system relative to the boresight; and update the at least one IMU based on the determined alignment data.

2. The system of claim 1, wherein:
the mobile platform includes an aircraft; and
the head-tracking system is embodied in an avionics display system, the avionics display system including at least one of a head-worn display (HWD) worn by the user and a head-up display (HUD) of the aircraft.

3. The system of claim 1, wherein the mobile platform includes at least one of a ground-based vehicle, a submersible vehicle, a ship, and an unmanned aerial vehicle (UAV).

4. The system of claim 1, wherein the controller is configured to:
in response to the engaging of the calibration mode, signal a display system of the mobile platform to provide the user with at least one calibration indication;
determine a confidence level of the alignment data; and
in response to the confidence level exceeding a predetermined confidence threshold, a) store the alignment data to the non-transitory processor-readable medium; b) disengage the calibration mode; and c) signal the display unit to terminate the at least one calibration indication.

5. The system of claim 1, wherein:
the at least one PRHT comprises at least one of a) an optical head tracker (OHT) configured to provide optical platform-referenced head pose data and b) a magnetic head tracker (MHT) configured to provide magnetic platform-referenced head pose data; and
the controller is configured to determine at least one of a) a misalignment of the OHT relative to at least one of the IRS and the mobile platform and b) a misalignment of the MHT relative to at least one of the IRS and the mobile platform based on the georeferenced aircraft pose data and at least one of the optical platform-referenced head pose data and the magnetic platform-referenced head pose data.

6. The system of claim 1, wherein the controller is further configured to:
store the alignment data in the non-transitory processor-readable medium;
monitor at least one error associated with the georeferenced aircraft pose data and the platform-referenced head pose data;
in response to the at least one error exceeding a predetermined error threshold, re-engage the calibration mode.

7. The system of claim 1, wherein:
the one or more fiducial markers are fixedly mounted relative to the head;
the at least one PRHT is fixedly mounted to the mobile platform; and
the controller is configured to determine at least one misalignment of the fiducial markers relative to at least one of the IRS and the mobile platform based on the georeferenced aircraft pose data and the platform-referenced head pose data.

8. A head-worn display (HWD), comprising:
at least one display unit configured to be attached to a head of a user, the display unit configured to provide georeferenced images and symbols to the user; and
a head-tracking system comprising:
a georeferenced head tracker (GHT) configured to be associated with the head and to provide georeferenced head pose data;
at least one platform-referenced head tracker (PRHT) configured to be associated with the head, the PRHT configured to determine platform-referenced head pose data based on one or more fiducial markers positioned within a mobile platform;
a controller coupled to the GHT and the at least one PRHT and configured to be coupled with at least one IRS of the mobile platform, the IRS configured to be aligned with a boresight of the mobile platform and to provide georeferenced pose data of the mobile platform, the controller including at least one processor coupled with a non-transitory processor-readable medium, the at least one processor configured to:
access the georeferenced aircraft pose data and the platform-referenced head pose data;
determine at least one misalignment of the PRHT relative to at least one of the IRS and the mobile platform based on the georeferenced aircraft pose data and the platform-referenced head pose data;
determine, based on the at least one misalignment, the georeferenced pose data of the mobile platform, and the platform-referenced head pose data, alignment data based on the alignment of the head-tracking system relative to the boresight; and
update the at least one PRHT based on the determined alignment data.

9. The HWD of claim 8, wherein the at least one PRHT includes at least one of:
an optical head-tracker configured to determine optical platform-referenced head pose data; and
a magnetic head-tracker configured to determine magnetic platform-referenced head pose data.

10. The HWD of claim 8, wherein the at least one processor is further configured to:
in response to the accessing the georeferenced aircraft pose data and the platform-referenced head pose data, signal the display unit to provide the user with at least one calibration indication;

determine at least one confidence level of the determined alignment data; and in response to the confidence level exceeding a predetermined confidence threshold, store the determined alignment data to the non-transitory processor-readable medium and signal the display unit to terminate the at least one calibration indication.

11. The HWD of claim 8, wherein:

the one or more fiducial markers are fixedly mounted relative to the head;

the at least one PRHT is fixedly mounted to the mobile platform; and the controller is configured to determine at least one misalignment of the fiducial markers relative to at least one of the IRS and the mobile platform based on the georeferenced aircraft pose data and the platform-referenced head pose data.

12. The HWD of claim 8, wherein the mobile platform includes at least one of a ground-based vehicle, a submersible vehicle, a ship, and a UAV.

13. A method for automatic boresighting of a head-tracking system, the method comprising:

engaging a calibration mode of a head-tracking system of a mobile platform;

generating georeferenced pose data of the mobile platform via an inertial reference system (IRS) of the mobile platform, the IRS aligned with a boresight of the mobile platform;

generating platform-referenced head pose data associated with a head of a user via at least one inertial measurement unit (IMU) of a platform-referenced head-tracker (PRHT) of the head-tracking system and a plurality of fiducial markers mounted in a fixed pattern within the mobile platform;

determining, via a processor coupled to the PRHT, at least one misalignment of the PRHT relative to at least one of the IRS and the mobile platform based on the georeferenced pose data of the mobile platform and the platform-referenced head pose data;

determining, via the processor, alignment data based on the alignment of the head-tracking system relative to the boresight based on the at least one misalignment, the georeferenced pose data of the mobile platform, and the platform-referenced head pose data; and updating the at least one IMU based on the determined alignment data.

14. The method of claim 13, wherein generating platform-referenced head pose data associated with a head of a user via at least one inertial measurement unit (IMU) of a platform-referenced head-tracker (PRHT) of the head-tracking system and a plurality of fiducial markers mounted in a fixed pattern within the mobile platform includes:

generating platform-referenced head pose data associated with a head of a user via at least one inertial measurement unit (IMU) of a platform-referenced head-tracker (PRHT) fixedly mounted to the mobile platform and a plurality of fiducial markers fixedly mounted relative to the head.

15. The method of claim 14, wherein determining, via a processor coupled to the PRHT, at least one misalignment of the PRHT relative to at least one of the IRS and the mobile platform based on the georeferenced pose data of the mobile platform and the platform-referenced head pose data includes:

determining, via a processor coupled to the PRHT, at least one misalignment of the fiducial markers relative to at least one of the IRS and the mobile platform and the platform-referenced head pose data.

16. The method of claim 13, wherein generating platform-referenced head pose data associated with a head of a user via at least one inertial measurement unit (IMU) of a platform-referenced head-tracker (PRHT) of the head-tracking system and a plurality of fiducial markers mounted in a fixed pattern within the mobile platform includes:

generating platform-referenced head pose data associated with a head of the user via at least one IMU of one or more of an optical head-tracker (OHT) and a magnetic head-tracker (MHT) of a head-tracking system and a plurality of fiducial markers mounted in a fixed pattern within the mobile platform.

17. The method of claim 13, wherein generating platform-referenced head pose data associated with a head of a user via at least one inertial measurement unit (IMU) of a platform-referenced head-tracker (PRHT) of the head-tracking system and a plurality of fiducial markers mounted in a fixed pattern within the mobile platform includes:

generating platform-referenced head pose data associated with a head of a user via at least one IMU of a platform-referenced head-tracker (PRHT) of at least one of a HWD worn by the user and a HUD of the mobile platform.

18. The method of claim 13, further comprising:

monitoring at least one error associated with the georeferenced aircraft pose data and the platform-referenced head pose data;

in response to the error exceeding a predetermined error threshold, re-engaging the calibration mode.

19. The method of claim 13, wherein engaging a calibration mode of a head-tracking system of a mobile platform includes:

signaling, via the processor, at least one display unit coupled to the head-tracking system to provide at least one calibration notification to the user.

20. The method of claim 19, further comprising:

determining, via the processor, at least one confidence level of the determined alignment data; and in response to the confidence level exceeding a predetermined confidence threshold:

storing the determined alignment data to the non-transitory processor-readable medium;

disengaging, via the processor, the calibration mode; and signaling the display unit to terminate the at least one calibration indication.

* * * * *